July 21, 1942.                E. NEIL                 2,290,482
                INSTRUMENT FOR MAKING MEASUREMENTS
                       Filed Aug. 28, 1940
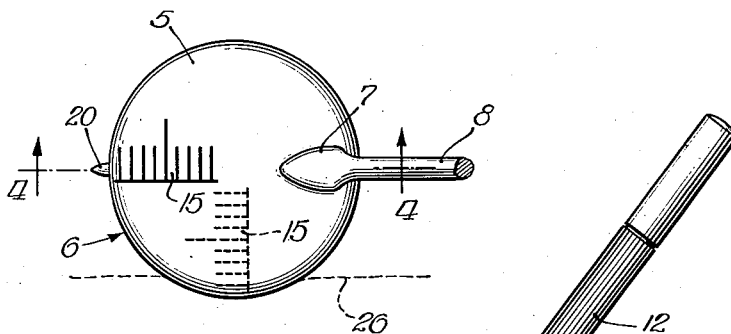
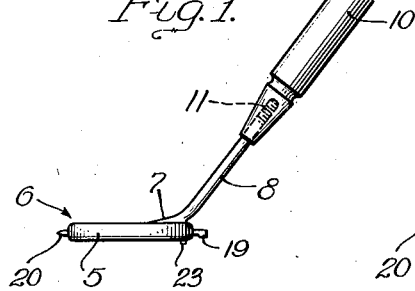
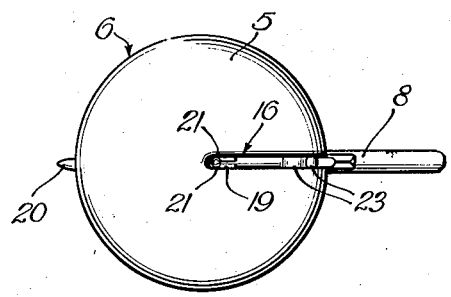
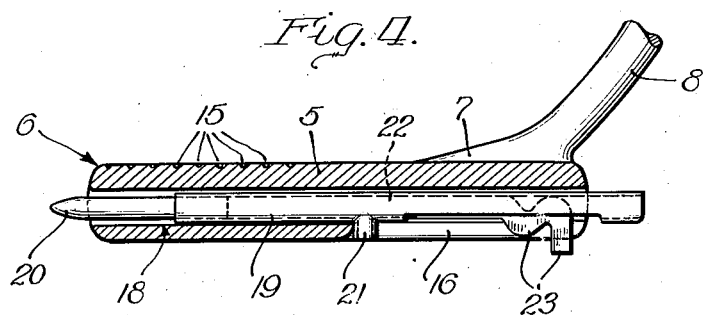
INVENTOR.
Ewell Neil
BY
Bevan, Jackson, Bettelu & Wenzel
Attys.

Patented July 21, 1942

2,290,482

UNITED STATES PATENT OFFICE 2,290,482

INSTRUMENT FOR MAKING MEASUREMENTS

Ewell Neil, Nashville, Tenn., assignor to Coe Laboratories, Inc., Chicago, Ill., a corporation of Illinois Application August 28, 1940, Serial No. 354,551

8 Claims. (Cl. 33—174)

This invention relates to an instrument for making measurements and registrations in the mouth, particularly in connection with the fitting of dental appliances.

One of the objects of the invention is to provide an instrument of the class described which is adapted to determine the depth of tissue overlying the bone, and to make possible the recording of same from a suitable scale on the instrument.

It is also an object of the invention to provide an instrument of the class described which is adapted to locate and mark the anatomical landmarks.

Another object of the invention is to provide an instrument of the class described which is of simple and inexpensive construction, and which may be handled and operated conveniently and effectively; also an instrument composed of relatively few parts.

Further objects and advantages of the invention will appear from the following detailed description taken in connection with the accompanying drawing, in which:

Figure 1 is a side view of one form of instrument embodying the present invention;

Figure 2 is a top plan view, on an enlarged scale, of the tissue exploring and depth measuring and locating and marking head of the instrument, with the stem or shank to which the handle is applied in section;

Figure 3 is a bottom plan view of the tissue exploring, and depth measuring and locating, and marking head of the instrument; and Figure 4 is a fragmentary section taken on the line 4—4 of Figure 2.

Referring now in detail to the drawing, the embodiment of the invention selected for illustration comprises a tissue exploring and depth measuring and locating and marking head 5. The head 5, which is formed of a metal or other material suitable for use in the mouth, is shown of circular form, and is of a diameter of the order of about 1⅜ of an inch, although this may vary widely.

The periphery of the head 5 is preferably well rounded, as indicated at 6. Rigidly secured at 7 to the upper face of the head 5 adjacent the periphery thereof is a stem or shank 8. The stem or shank 8 extends obliquely upwardly and outwardly from the head 5, and has a handle 10 detachably secured thereto, for example, by threaded engagement at 11. The handle 10 may be knurled or otherwise finished at 12.

The upper surface of the head 5 has a scale 15 shown disposed diametrically opposite the handle 10. This scale 15 has millimeter graduations reading inwardly from the outer periphery of the head 5.

A radial slot 16 opens from the bottom face of the head 5, and extends out radially from the center of the head through the periphery of the head adjacent the stem or shank 8. An opening 18 is located between the upper and lower faces of the head 5 and continues radially from the inner end of the slot 16 and out through the opposite side of the head adjacent the scale 15. A split metal sleeve 19, slidable in the slot 16 and in the coextensive opening 18, is adapted to hold a piece of lead 20, or other suitable means, for marking the location of the depression or other anatomical landmark in the bone.

The split sleeve 19 has a pair of lugs 21, 21 which extend into the slot 16 from the opposite sides of the split portion of the sleeve. The width of the slot 16, as viewed in Figure 3, is preferably such as to press the lugs 21, 21 together, thereby contracting the sleeve 19 securely to grip the lead 20. A stem 22 is disposed within the sleeve 19, with its inner end abutting the adjacent end of the lead 20. The outer end of the stem 22 has a portion formed at 23 and extending laterally through the slot 16 to act with the lugs 21, 21 to prevent turning of the lead and its holder and to provide a finger piece for manipulation of the lead from the bottom face of the head 5.

In exploring and measuring the depth of the tissue overlying the bone or the depth of the notch or other anatomical landmark along the alveolar arch at the left hand side of the mouth, the head 5 is placed in the mouth with the rounded peripheral surface 6 engaging the tissue as shown in Figure 2, the tissue being indicated more or less diagrammatically in dotted lines at 26. The head 5 as thus positioned is then passed along the tissue on the alveolar arch, particularly along the posterior end of the arch, until the depression in the bone (called the hamular notch) is found. The rounded peripheral surface 6 sinks into this notch as shown in Figure 2, so that by turning the head 5 ninety degrees in a clockwise direction from the position shown in Figure 2 the scale 15 is disposed in the position shown in dotted lines and indicates by the depth to which the rounded edge 6 sinks into the notch the depth of such notch or the depth of the tissue overlying the same. This depth may be recorded from the millimeter readings on the scale 15.

The lead 20 may be retracted during the exploring and depth measuring operation. When it is desired to mark the location of the notch or other landmark the lead 20 is set in its projected position as shown in full lines in Figure 2, and with the head 5 of the instrument positioned with the scale disposed generally vertically as shown in Figure 2 and the lead 20 in projected position (not shown in the dotted line position of the scale) the head is rocked or moved with a sweeping movement of the rounded edge 6 on the tissues 26 and the lead marks or records the location of the notch or other landmark for use, for example, in fitting a dental appliance in the alveolar arch.

In exploring and recording landmarks on the right side of the mouth the instrument is applied reversely from the position shown in Figure 2 and the head 5 is rotated clockwise to dispose the scale 15 generally vertically for measuring the depth of the notch or tissue and to dispose the lead for the marking and recording operation.

I do not intend to be limited to the precise details shown or described.

I claim:

1. An instrument for making measurements and registrations in the mouth comprising a head having a generally rounded periphery adapted to be passed along the tissue on the posterior portion of the alveolar arch until the hamular notch is located, a scale on said head extending radially inwardly from the generally rounded periphery of the head and adapted when disposed generally normal to the surface of the tissue to measure the depth of the tissue by the amount the generally rounded periphery of the head sinks into the tissue, and a handle extending from said head.

2. An instrument for making measurements and registrations in the mouth comprising a head having a generally rounded periphery adapted to be passed along the tissue on the posterior portion of the alveolar arch until the hamular notch is located, a scale on said head extending radially inwardly from the generally rounded periphery of the head and adapted when disposed generally normal to the surface of the tissue to measure the depth of the tissue by the amount the generally rounded periphery of the head sinks into the tissue, a handle extending from said head, and means carried by said head for marking the location of said notch by a sweep of said head after the anatomical landmark has been located.

3. An instrument for making measurements and registrations in the mouth comprising a head having a generally rounded periphery adapted to be passed along the tissue on the posterior portion of the alveolar arch until the hamular notch is located, a scale on said head extending radially inwardly from the generally rounded periphery of the head and adapted when disposed generally normal to the surface of the tissue to measure the depth of the tissue by the amount the generally rounded periphery of the head sinks into the tissue, and means carried by said head for marking the location of said notch by a sweep of said head after the anatomical landmark has been located, said handle extending obliquely upwardly and outwardly from the outer periphery of the upper surface of said head and said scale being disposed on the outer periphery of the upper surface of said head substantially diametrically opposite said handle.

4. An instrument for making measurements and registrations in the mouth comprising a head having a periphery adapted to be passed along the tissue on the posterior portion of the alveolar arch until the hamular notch is located, a handle extending from said head, a scale on said head for measuring the depth of the tissue overlying the bone, and means carried by said head for marking the location of said notch by a sweep of said head after the anatomical landmark has been located, said handle extending obliquely upwardly and outwardly from the outer periphery of the upper surface of said head and said scale being disposed on the outer periphery of the upper surface of said head substantially diametrically opposite said handle, said marking means being operable in a diametrical opening in said head and having a holder provided with manipulating means extending through a slot opening from the bottom surface of said head.

5. An instrument of the class described comprising a generally circular head having a rounded periphery, a handle extending from said head, and a scale provided on the upper surface of said head and reading inwardly from the outer periphery of said head and adapted when disposed generally normal to the surface of the tissue to measure the depth of the tissue by the amount the generally rounded periphery of the head sinks into the tissue.

6. An instrument of the class described comprising a generally circular head having a rounded periphery, a handle extending obliquely upwardly and outwardly from the upper surface of said head, a scale provided on the upper surface of said head and reading inwardly from the outer periphery of said head, a slot opening from the bottom surface of said head and extending radially from the center of said head through the periphery of the head at one side thereof, said head having an opening coextensive with said slot and extending out through the opposite side of said head, a lead holder slidable in said slot and said coextensive opening, and a piece of lead carried by said holder and operable through the outer end of said opening in position adjacent said scale.

7. An instrument of the class described comprising a generally circular head having a rounded periphery, a handle extending obliquely upwardly and outwardly from the upper surface of said head, a scale provided on the upper surface of said head and reading inwardly from the outer periphery of said head, a slot opening from the bottom surface of said head and extending radially from the center of said head through the periphery of the head at one side thereof, said head having an opening coextensive with said slot and extending out through the opposite side of said head, a lead holder slidable in said slot and said coextensive opening, a piece of lead carried by said holder and operable through the outer end of said opening in position adjacent said scale, and lugs on said lead holder clamped together by engagement in said slot to cause the holder to grip the lead.

8. An instrument of the class described comprising a generally circular head having a rounded periphery, a handle extending from said head, a scale provided on the upper surface of said head and reading inwardly from the outer periphery of said head, a slot opening from the bottom surface of said head and extending radially from the center of said head through the periphery of the head at one side thereof, said head having an opening coextensive with said slot and extending out through the opposite side of said head, a lead holder slidable in said slot and said coextensive opening, a piece of lead carried by said holder and operable through the outer end of said opening in position adjacent said scale, lugs on said lead holder clamped together to cause the holder to grip the lead by engagement of said lugs in said slot, and a stem disposed in said lead holder with its inner end abutting the lead and with its outer end formed to engage in and project from said slot to prevent turning of the holder and to provide for manipulation of the lead from the bottom surface of said head.

EWELL NEIL.